United States Patent Office 3,849,450
Patented Nov. 19, 1974

3,849,450
BIS(TRIFLUOROMETHYL)EPOXIDES
Jacques G. O'Rear, Camp Springs, and James R. Griffith, Riverdale Heights, Md., assignors to the United States of America as represented by the Secretary of the Navy
No Drawing. Original application Feb. 2, 1973, Ser. No. 328,986, now abandoned. Divided and this application Dec. 11, 1973, Ser. No. 423,847
Int. Cl. C07d 1/00
U.S. Cl. 260—348 R         1 Claim

ABSTRACT OF THE DISCLOSURE

Bis(trifluoromethyl)epoxides are synthesized to provide compounds useful in the formation of highly fluorinated condensation polymers.

This application is a division of Ser. No. 328,986, filed Feb. 2, 1973, and now abandoned.

BACKGROUND OF THE INVENTION

The invention relates to fluorinated epoxide compounds which are either monofunctional or difunctional. The compounds are useful as precursors to produce fluorinated polymers. The difunctional compound can be polymerized to form high fluorinated high molecular weight polymers useful as coatings, plastics and laminates.

In the past it has been difficult to produce highly fluorinated polymers from epoxide precursors using typical epoxide curing agents such as amine compounds. Sianesi et al. noted in the *Journal of Organic Chemistry*, Vol. 31, Page 2312 (1966) that HF is evolved by such a reaction. Thus, some of the fluorine content is lost when the fluorinated epoxy precursors are polymerized and undesirable foams are obtained.

SUMMARY OF THE INVENTION

The novel compounds are precursors to the formation of fluorinated polymers. The difunctional epoxide is especially useful for the formation of highly fluorinated, high molecular weight polymers. When polymerized, HF is not evolved and thus the resulting polymers are produced without any loss of fluoride content.

It is, therefore, an object of the invention to provide both monofunctional and difunctional compounds used to produce highly fluorinated polymers.

It is another object of the invention to provide fluorinated epoxide compounds that do not lose fluoride ions during polymerization.

Other objects, advantages and novel features of the invention will become apparent from the following detailed description of the invention.

DESCRIPTION OF THE INVENTION

The invention relates to the formation of fluoroepoxy compounds. More specifically it relates to the formation of bis(trifluoromethyl)epoxides. Two of the compounds are monofunctional epoxides, the third is difunctional.

The monofunctional epoxide compounds are produced, generally, by the reaction of a diazo compound and hexafluoroacetone. The following reaction is illustrative.

$$RCHN_2 + (CF_3)_2C=O \longrightarrow \underset{CF_3}{\overset{CF_3}{\diagdown}}C\underset{O}{\overset{}{\diagup\diagdown}}C\overset{H}{\underset{}{-}}R + N_2 \quad (A)$$

The following examples illustrates the reaction schemes used to produce the novel compounds. Example I illustrates the production of compound (A) where R is $C_6H_5$. Example II is drawn to the production of compound (A) where R is $CF_3(CF_2)_n$, $n$ being an integer from 2 to 8. Example III is directed to the production of the difunctional epoxide having the formula $$\underset{CF_3}{\overset{CF_3}{\diagdown}}C\underset{O}{\overset{}{\diagup\diagdown}}\overset{H}{\underset{}{C}}-\underset{}{\bigcirc}-\overset{H}{\underset{}{C}}\underset{O}{\overset{}{\diagdown\diagup}}C\underset{CF_3}{\overset{CF_3}{\diagup}}$$

EXAMPLE I

Preparation of 2-Phenyl-3, 3-bis(trifluoromethyl)oxirane $$C_6H_5CH_2NHCHN_2 \xrightarrow[-50°C]{N_2O_4} C_6H_5CH_2N-\underset{O}{\overset{N=O}{\underset{|}{C}}}-NH_2$$
$$\underset{O}{\phantom{C_6H_5CH_2NHCHN_2}}$$

$$\Bigg\downarrow \begin{array}{l}\text{THF}\\\text{LiOEt}\\-10°\text{ C}\end{array}$$

$$\underset{CF_3}{\overset{CF_3}{\diagdown}}C\underset{O}{\overset{}{\diagup\diagdown}}\overset{H}{\underset{}{C}}-C_6H_5 \xleftarrow{(CF_3)_2C=O} C_6H_5CHN_2$$
(I)

150.2 grams of Benzylurea was nitrosated at −50° C. producing a 60% yield of N-nitroso-N-benzylurea. In a flask equipped with a Dry Ice-alcohol condenser, 0.30 moles of the N-nitroso-N-benzlurea was mixed with 450 ml. of tetrahydroforan (THF) at −10° C.

0.52 grams of lithium ethoxide was added portionwise (15 minutes). The deep orange color of the mixture indicated the presence of phenyldiazomethane. Maintaining the cooling conditions hexafluoroacetone was bubbled into the mixture at a rate of 200 ml./min. for 1 hour to discharge the red orange color. Gas addition for another hour led to a slow reflux of excess hexafluoroacetone. Distillation of the final mixture yielded 21.0 grams of compound I.

EXAMPLE II

Preparation of 2-(1-Heptafluoropropyl)-3,3-bis-(trifluoromethyl)oxirane $$CF_3CF_2CF_2CONH_2 \xrightarrow{NaAlH_2(OCH_2CH_2OCH_3)_2}$$

$$CF_3CF_2CF_2CH_2NH_2$$

$$\Bigg\downarrow$$

$$\xleftarrow{(CF_3)_2C=O} CF_3CF_2CF_2CHN_2$$

$$\underset{CF_3}{\overset{CF_3}{\diagdown}}C\underset{O}{\overset{}{\diagup\diagdown}}\overset{H}{\underset{}{C}}-CF_2CF_2CF_3$$
(II)

Heptafluorobutyramide was reduced to 2,2,3,3,4,4,4-heptafluro-n-butylamine by a modification of Samders method appearing in Monatsh 95 (2), 608 (1964). 4 grams of the amine was diazotized and 2.42 grams of 2,2,3,3,4,4,4-heptafluoroacetone was then reacted with the heptafluorodiazo-n-butane first at −60° C., then at 0° C. and finally at room temperature. This yielded 4.07 grams of compound II.

EXAMPLE III

Preparation of 1,4-bis(3,3-bis(trifluoromethyl)-oxiran-2-yl)benzene

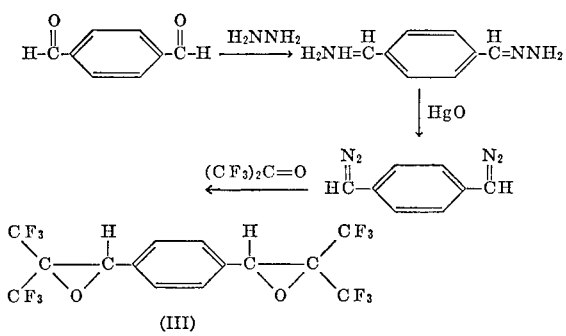

Terephthaladehyde was reacted with hydrazine to obtain terephthaladehyde dihydrazone. A 93% yield having a melting point of 105° C. was obtained. 9.7 grams of terephthaladehyde was then oxidized with mercuric oxide in benzene. 7 grams of 1,4-bis(α-diazomethyl)benzene, a reddish orange solid, was obtained. Redissolving the 1,4-bis(α-diazomethyl)benzene in 200 ml. of benzene gave a deep cherry red solution which was maintained at 0° C. Hexafluoroacetone was then bubbled through the cherry red solution at a rate of 200 cc./min. for 11 minutes. Distillation resulted in 6.04 grams of compound III.

0.64 grams of compound I was mixed with 0.268 grams of benzylamine and t-amyl alcohol (5 ml.) at 60° C. for three weeks. Rotary evaporation of the mixture left 0.833 grams of N-(2-hydroxy-1-phenyl-3,3,3 - trifluoromethyl propyl)benzylamine, compound IV.

Because the compounds do not give up any fluorine when reacted with amines, the compounds are useful as precursors of highly fluorinated polymers. Highly fluorinated coatings, laminates and plastics can thus be produced without any fear of defluorinating the precursor. For example, fluorinated hydroxy polyamine polymers are produced when a stoichiometric mixture of compound III and alkyl or aralkyl polyamines such as diethylenetriamine, tetracetylenepentamine, and m-xylenediamine are reacted. The reaction was performed at 100° C. to 140° C. The fluorinated polymer produced is highly hydrophobic and is, therefore, useful as an adhesive or a protective coating.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

TABLE I

| Compound | Formula | Yield, percent | B.P. (° C.) | Carbon, percent | | Hydrogen, percent | | Fluorine, percent | |
|---|---|---|---|---|---|---|---|---|---|
| | | | | Calcd. | Found | Calcd. | Found | Calcd. | Found |
| Example: | | | | | | | | | |
| I | $C_{10}H_6F_6O$ | 27.3 | 85° at 50 mm | 46.89 | 47.13 | 2.36 | 2.58 | 44.50 | 44.55 |
| II | $C_7HF_{13}O$ | 58.4 | 70° at 760 mm | 24.15 | 24.31 | 0.29 | 0.29 | 70.96 | 70.81 |
| III | $C_{14}H_6O_2F_{12}$ | 29.6 | 115°–116° at 20 mm | 38.73 | 38.71 | 1.39 | 1.41 | 52.51 | 52.38 |

Table I lists the physical data obtained on the three compounds. In addition the refractive index ($n_D^{20}$) of compound I was found to be 1.4062 while its molecular weight was 256.

It was also found that the epoxide ring of the novel compounds could be opened without any damage to the fluoride groups. This is illustrated by the following example in which compound I is reacted with an amine.

EXAMPLE IV

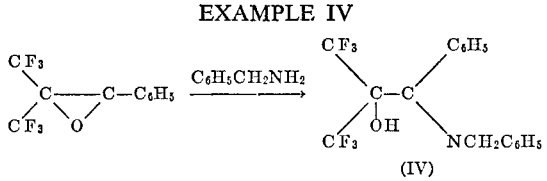

1. A difunctional epoxide compound comprising the formula

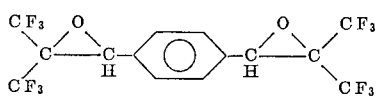

No references cited.

NORMA S. MILESTONE, Primary Examiner

U.S. Cl. X.R.

260—570.7, 2 EP